(12) United States Patent
Xu et al.

(10) Patent No.: US 11,062,708 B2
(45) Date of Patent: Jul. 13, 2021

(54) METHOD AND APPARATUS FOR DIALOGUING BASED ON A MOOD OF A USER

(71) Applicant: BAIDU ONLINE NETWORK TECHNOLOGY (BEIJING) CO., LTD., Beijing (CN)

(72) Inventors: Li Xu, Beijing (CN); Yingchao Li, Beijing (CN); Xiaoxin Ma, Beijing (CN)

(73) Assignee: BAIDU ONLINE NETWORK TECHNOLOGY (BEIJING) CO., LTD. (CN)

( * ) Notice: Subject to any disclaimer, the term of this patent is extended or adjusted under 35 U.S.C. 154(b) by 76 days.

(21) Appl. No.: 16/509,908

(22) Filed: Jul. 12, 2019

(65) Prior Publication Data

US 2019/0333514 A1    Oct. 31, 2019

(30) Foreign Application Priority Data

Aug. 6, 2018    (CN) .......................... 201810887638.X

(51) Int. Cl.
*G10L 15/22*    (2006.01)
*G10L 15/18*    (2013.01)
*G10L 25/63*    (2013.01)

(52) U.S. Cl.
CPC .......... *G10L 15/22* (2013.01); *G10L 15/1815* (2013.01); *G10L 25/63* (2013.01); *G10L 2015/223* (2013.01)

(58) Field of Classification Search
CPC ..... G10L 15/22; G10L 15/1815; G10L 25/63; G10L 2015/223
See application file for complete search history.

(56) References Cited

U.S. PATENT DOCUMENTS 4,783,802 A * 11/1988 Takebayashi ......... G10L 15/063
                                                                704/233
4,827,516 A *  5/1989 Tsukahara ............... G10L 15/00
                                                                704/203

(Continued)

FOREIGN PATENT DOCUMENTS

CN            103543979 A        1/2014
CN            104992715 A       10/2015

(Continued)

OTHER PUBLICATIONS

Second Office Action Issued in Chinese Patent Application No. 201810887638.X, dated Jul. 15, 2020, 9 pages.

(Continued)

*Primary Examiner* — Eric Yen
(74) *Attorney, Agent, or Firm* — Dilworth IP, LLC

(57) ABSTRACT

A method and an apparatus for dialoguing based on a mood of a user, where the method includes: collecting first audio data from the user, determining the mood of the user according to a feature of the first audio data, and dialoguing with the user using second audio data corresponding to the mood of the user. The method and the apparatus for dialoguing based on the mood of the user provided by the present disclosure may make different responses according to the mood of the user when dialoguing with the user. Therefore, it further enriches response that the electronic device may make according to voice data of the user, and further improves the user experience during dialoguing with the electronic device.

13 Claims, 1 Drawing Sheet

(56) References Cited

U.S. PATENT DOCUMENTS

| | | | | |
|---|---|---|---|---|
| 5,647,834 A * | 7/1997 | Ron | A61B 5/16 | 600/23 |
| 5,794,190 A * | 8/1998 | Linggard | G10L 15/08 | 704/232 |
| 5,819,222 A * | 10/1998 | Smyth | G10L 15/08 | 704/256.1 |
| 5,956,684 A * | 9/1999 | Ishii | G01C 21/3608 | 704/246 |
| 6,006,180 A * | 12/1999 | Bardaud | G10L 15/20 | 704/223 |
| 9,293,134 B1 * | 3/2016 | Saleem | G10L 15/22 | |
| 9,633,652 B2 * | 4/2017 | Kurniawati | G10L 15/00 | |
| 9,812,146 B1 * | 11/2017 | Gejji | G10L 21/0208 | |
| 10,332,543 B1 * | 6/2019 | Zopf | G10L 15/22 | |
| 2001/0056346 A1 * | 12/2001 | Ueyama | G10L 15/30 | 704/246 |
| 2002/0010579 A1 * | 1/2002 | Kitaoka | G01C 21/3608 | 704/231 |
| 2003/0167167 A1 * | 9/2003 | Gong | G10L 15/22 | 704/250 |
| 2005/0096899 A1 * | 5/2005 | Padhi | G10L 15/10 | 704/216 |
| 2007/0192097 A1 * | 8/2007 | Ma | G10L 25/48 | 704/239 |
| 2008/0201144 A1 * | 8/2008 | Song | G10L 15/08 | 704/236 |
| 2010/0022283 A1 * | 1/2010 | Terlizzi | H04M 1/05 | 455/570 |
| 2014/0214421 A1 * | 7/2014 | Shriberg | G10L 25/87 | 704/243 |
| 2014/0229175 A1 * | 8/2014 | Fischer | G10L 15/22 | 704/235 |
| 2014/0270260 A1 * | 9/2014 | Goertz | G10L 15/22 | 381/110 |
| 2015/0154964 A1 * | 6/2015 | Ooi | G10L 19/26 | 704/201 |
| 2015/0179168 A1 * | 6/2015 | Hakkani-Tur | G10L 15/22 | 704/257 |
| 2015/0206543 A1 * | 7/2015 | Lee | G10L 25/63 | 704/270 |
| 2017/0047063 A1 * | 2/2017 | Ohmura | G06F 3/04817 | |
| 2017/0083281 A1 * | 3/2017 | Shin | G10L 13/033 | |
| 2017/0221336 A1 * | 8/2017 | Ogaz | G08B 21/0423 | |
| 2017/0372695 A1 * | 12/2017 | Takei | G10L 15/187 | |
| 2018/0032610 A1 * | 2/2018 | Cameron | G06F 40/284 | |
| 2018/0047395 A1 * | 2/2018 | Sommers | G06F 40/169 | |
| 2018/0061393 A1 * | 3/2018 | Osotio | G10L 25/63 | |
| 2018/0330737 A1 * | 11/2018 | Paulik | G10L 15/063 | |
| 2019/0080708 A1 * | 3/2019 | Mohan | G10L 25/60 | |

FOREIGN PATENT DOCUMENTS

| | | |
|---|---|---|
| CN | 106297826 A | 1/2017 |
| CN | 106570496 A | 4/2017 |
| CN | 106649704 A | 5/2017 |
| CN | 106782615 A | 5/2017 |
| CN | 107464566 A | 12/2017 |

OTHER PUBLICATIONS

Office Action dated Mar. 20, 2020 in Corresponding Chinese Application No. 201810887638.X, 8 pages.

* cited by examiner

METHOD AND APPARATUS FOR DIALOGUING BASED ON A MOOD OF A USER

CROSS-REFERENCE TO RELATED APPLICATIONS

This application claims priority to Chinese Patent Application No. 201810887638.X, filed on Aug. 6, 2018, which is incorporated herein by reference in its entirety.

FIELD

The present disclosure relates to the technical field of an intelligent device and, in particular, to a method and an apparatus for dialoguing based on a mood of a user.

BACKGROUND

At present, with the rapid development of artificial intelligence, machine learning and network technology, for communication between people and intelligent electronic device, it may not only realize a communication way of inputting an instruction to an intelligent electronic device and responding by the intelligent electronic device with text content, but also a communication way of dialoguing through audio data for interaction, so that a user may use the intelligent electronic device to schedule a meeting, learn skills, listen to news and the like through a way of dialoguing, or may dialogue with the intelligent electronic device.

In the prior art, when the user communicates with the intelligent electronic device through a way of dialoguing, the intelligent electronic device may collect audio data said by the user, perform related processing and analysis on the audio data, and determine information that the user wants to express in the audio data, so as to respond to the user based on the information. For example, the user may say "what's the weather today" to the electronic device, the electronic device collects the audio data, performs semantic analysis on the audio data to determine information expressed by the user, and may play audio data of "it is sunny today" to the user after querying the current weather through the Internet.

In the prior art, since the electronic device may only provide the user with an unilateral systemized response, the user's actual feeling and use condition may not be considered, which leads to that the response made by the electronic device according to voice data of the user is relatively simple, when the user dialogues with the electronic device.

SUMMARY

The disclosure provides a method and an apparatus for dialoguing based on a mood of a user, which enriches responses made by an electronic device according to user's audio data when dialoguing with the user, thereby improving the user experience.

A first aspect of the present disclosure provides a method for dialoguing based on a mood of a user, including:
collecting first audio data from the user;
determining the mood of the user according to a feature of the first audio data; and
dialoguing with the user using second audio data corresponding to the mood of the user.

In an embodiment of the first aspect of the present disclosure, the determining the mood of the user according to the feature of the first audio data includes:
determining the mood of the user according to an attribute of the first audio data, where the attribute includes at least one or more of the followings: amplitude, tone, timbre, frequency, and duration of the first audio data.

In an embodiment of the first aspect of the present disclosure, the determining the mood of the user according to the feature of the first audio data includes:
determining the mood of the user according to semantics of the first audio data.

In an embodiment of the first aspect of the present disclosure, the dialoguing with the user using the second audio data corresponding to the mood of the user includes:
determining the second audio data corresponding to the mood of the user by searching a first mapping relationship, where the first mapping relationship includes at least one correspondence between a mood and an audio data; and
dialoguing with the user using the second audio data.

In an embodiment of the first aspect of the present disclosure, it further includes:
determining at least one correspondence between a mood and the audio data; and
determining the first mapping relationship according to the at least one correspondence between the mood and the audio data.

In an embodiment of the first aspect of the present disclosure, the dialoguing with the user using the second audio data corresponding to the mood of the user includes:
determining an audio data processing manner corresponding to the mood of the user by searching a second mapping relationship, where the second mapping relationship includes at least one correspondence between a mood and an audio data processing manner;
processing the second audio data with the audio data processing manner; and
dialoguing with the user using the processed second audio data.

In an embodiment of the first aspect of the present disclosure, before the determining the audio data processing manner corresponding to the mood of the user by searching the second mapping relationship, it further includes:
determining the second audio data according to semantics of the first audio data.

In an embodiment of the first aspect of the present disclosure, it further includes:
determining a at least one correspondence between a mood and the audio data processing manner; and
determining the second mapping relationship according to the at least one correspondence between the mood and the audio data processing manner.

In an embodiment of the first aspect of the present disclosure, the collecting the first audio data from the user includes:
collecting the first audio data from the user when voice data of the user is detected.

In an embodiment of the first aspect of the present disclosure, the collecting the first audio data from the user includes:
collecting the first audio data from the user every preset time interval.

In summary, in a method for dialoguing based on a mood of a user provided by the first aspect of the present disclosure, a dialogue is made with a user using second audio data corresponding to the mood of the user by collecting first audio data from the user and determining the mood of the user according to the first audio data. Therefore, an electronic device may make different responses according to the mood of the user when dialoguing with the user, thereby enriching responses that the electronic device may make according to voice data of the user, and further improving the user experience during dialoguing with the electronic device.

A second aspect of the present disclosure provides a dialog apparatus based on a mood of a user, including:

a collecting module, configured to collect first audio data from the user;

a determining module, configured to determine a mood of the user according to a feature of the first audio data; and a dialoguing module, configured to dialogue with the user using second audio data corresponding to the mood of the user.

In an embodiment of the second aspect of the present disclosure, the determining module is specifically configured to:

determine the mood of the user according to an attribute of the first audio data, where the attribute includes at least one or more of the followings: amplitude, tone, timbre, frequency, and duration of the first audio data.

In an embodiment of the second aspect of the present disclosure, the determining module is specifically configured to:

determine the mood of the user according to semantics of the first audio data.

In an embodiment of the second aspect of the present disclosure, the dialoguing module is specifically configured to:

determine the second audio data corresponding to the mood of the user by searching a first mapping relationship, where the first mapping relationship includes at least one correspondence between a mood and audio data; and dialogue with the user using the second audio data.

In an embodiment of the second aspect of the present disclosure, the dialoguing module is specifically configured to:

determine an audio data processing manner corresponding to the mood of the user by searching a second mapping relationship, where the second mapping relationship includes at least one correspondence between a mood and an audio data processing manner;

process the second audio data with the audio data processing manner; and dialogue with the user using the processed second audio data.

In an embodiment of the second aspect of the present disclosure, the dialoguing module is further configured to:

determine the second audio data according to semantics of the first audio data.

In an embodiment of the second aspect of the present disclosure, the collecting module is specifically configured to:

collect the first audio data from the user when voice data of the user is detected.

In an embodiment of the second aspect of the present disclosure, the collecting module is specifically configured to:

collect the first audio data from the user every preset time interval.

In summary, in an apparatus for dialoguing based on a mood of a user provided by the second aspect of the present disclosure, a dialoguing module makes a dialogue with a user using second audio data corresponding to the mood of the user by collecting first audio data from the user through a collecting module and determining the mood of the user through a determining module according to a feature of the first audio data. Therefore, an electronic device may make different responses according to the mood of the user when dialoguing with the user, thereby enriching responses that the electronic device may make according to voice data of the user, and further improving the user experience during dialoguing with the electronic device.

A third aspect of the present disclosure provides an electronic device readable storage medium, including a program, when the program is run on an electronic device, causing the electronic device to perform the method according to any one of the first aspect as described above.

BRIEF DESCRIPTION OF DRAWINGS

In order to illustrate the embodiments of the present disclosure or technical solutions in the prior art clearer, the drawings used in the embodiments or the description of the prior art will be briefly described below. Obviously, the drawings in the following description are merely some embodiments of the present disclosure, and persons of ordinary skill in the art may obtain other drawings without any creative effort.

DETAILED DESCRIPTION

Technical solutions in embodiments of the present disclosure are clearly and completely described in the following with reference to the accompanying drawings. It is obvious that the described embodiments are merely a part of rather than all embodiments of the present disclosure. All other embodiments obtained by persons of ordinary skill in the art based on embodiments of the present disclosure without creative effort shall fall within the protection scope of the present disclosure.

The terms "first", "second", "third", "fourth", etc. (if present) in the specification, claims and the above drawings of the present disclosure are used to distinguish similar objects, but not used to describe a specific order or sequence. It should be understood that such numerical terms used may be interchanged where appropriate, so that the embodiments of the disclosure described herein may be implemented, for example, in an order other than those illustrated or described herein. In addition, the terms "include" and "have" and any variations thereof are intended to cover a non-exclusive inclusion, for example, a process, a method, a system, a product, or a device including a series of steps or units is not necessarily limited to those explicitly listed steps or units, but may include other steps or units which are not explicitly listed or inherent to such process, method, product or apparatus.

Technical solutions of the present disclosure will be described in detail below with specific embodiments. The following specific embodiments may be combined with each other, and the same or similar concepts or processes may not be repeated in some embodiments.

Figure 1:
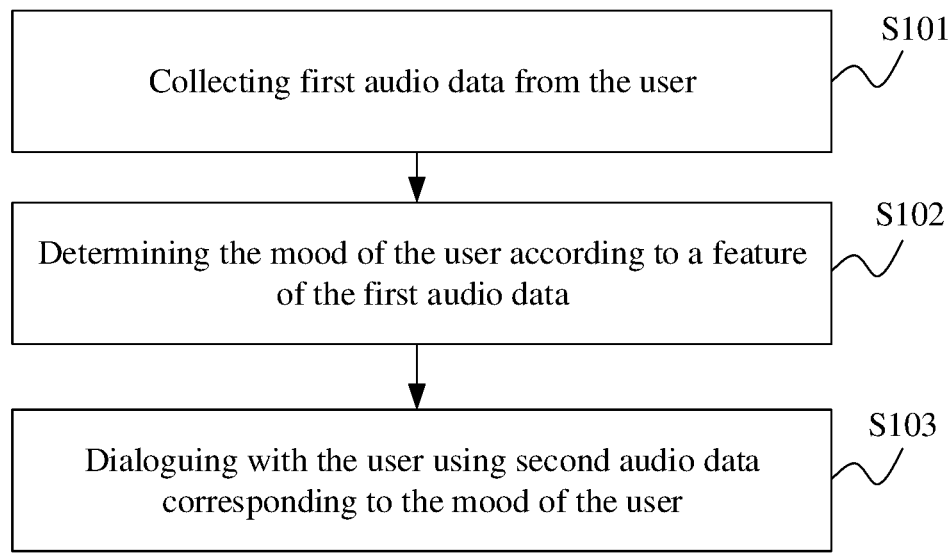
FIG. 1 is a schematic flowchart of a method for dialoguing based on a mood of a user according to an embodiment of the present disclosure.

FIG. 1 is a schematic flowchart of a method for dialoguing based on a mood of a user according to an embodiment of the present disclosure. As shown in FIG. 1, the method for dialoguing based on the mood of the user provided by the embodiment including:

S101: collecting first audio data from the user.

In this step, an electronic device collects first audio data from the user to perform analysis and processing on voice data of the user. Where the audio data refers to an electronic data obtained after the electronic device collects words spoken by the user, for example, the data may be a record of the words spoken by the user, and the electronic device may directly process the audio data. It should be noted that an execution entity of this embodiment may be an electronic device having an associated data processing function, such as an intelligent loudspeaker, an intelligent phone, an intelligent watch and the like. In addition, the electronic device may also be one with data processing function, such as a mobile phone, a Pad, a computer with wireless transceiver function, a virtual reality (VR) electronic device, an augmented reality (AR) electronic device, an electronic device in industrial control, an electronic device in self driving, an electronic device in remote medical surgery, an electronic device in smart grid, an electronic device in transportation safety, an electronic device in smart city, an electronic device in smart home, and the like.

Specifically, the electronic device may obtain the voice data of the user by using, but not limited to, the following ways: firstly, directly obtaining existing voice data of the user, for example, the electronic device may read the voice data of the user stored in an internal storage of the electronic device, or the electronic device obtains the voice data of the user through the Internet; secondly, capturing the voice data of the user through an audio processing software in the electronic device; and thirdly, collecting the voice data of the user through an audio processing apparatus such as a microphone arranged in the electronic device. The above three ways may be used alternatively or in combination in this step.

Optionally, a possible implementation manner of S101 is collecting the first audio data from the user when the voice data of the user is detected. Where the electronic device may collect words spoken by the user as the first audio data when the electronic device dialogues with the user. Alternatively, the electronic device collects the first audio data from the user when it is detected that the user starts talking, after that the electronic device does not dialogue with the user.

Optionally, another possible implementation manner of S101 is collecting the first audio data from the user every preset time interval. For example, the user is talking all the time, but does not dialogue with the electronic device, at this time the electronic device may collect the first audio data from the user every interval, for example, 10 minutes, and may store the collected first audio data in the storage of the electronic device so as to obtain it from the storage for later processing.

S102: determining the mood of the user according to a feature of the first audio data.

Specifically, in S102, the electronic device as the execution entity determines the mood of the user with the first audio data obtained from the user in S101. Where, the electronic device may determine the mood of the user according to the feature of the first audio data by extracting the feature of the first audio data. The electronic device may store correspondences between different features and moods to determine a corresponding mood according to the feature of the first audio data. With the correspondences between different features and different moods, a machine learning-based mood recognition model corresponding different features and different moods may be determined in a big data learning manner, and the mood recognition model may be increased according to features of audio data newly obtained and corresponding mood thereof at any time.

Optionally, the feature of the first audio data in this embodiment may be an attribute of the first audio data, where the attribute includes at least one or more of the followings: amplitude, tone, timbre, frequency, and duration of the first audio data. A specific implementation manner of S102 is determining the mood of the user according to the attribute of the first audio data. For example, the correspondences between features and moods stored in the electronic device are: "frequency greater than 300 Hz—angry", "frequency less than 100 Hz—fear". Thus, the electronic device, by extracting a feature of the first audio data obtained, for example, the frequency of the first audio data being 400 Hz, determines that a mood corresponding to the feature is angry, i.e. determines that the mood of the user is angry. In addition, other corresponding manners between features such as tone, timbre, and amplitude and moods are the same as the above examples, and will not be described again. And the corresponding manners between moods and features may be one-to-one, one-to-many or many-to-one. For example, when a frequency of an audio data is greater than 250 Hz and an amplitude thereof is greater than a first preset threshold, a corresponding mood is angry.

Optionally, the feature of the first audio data in this embodiment may be semantics of the first audio data. Thus, another specific implementation manner of S102 is determining the mood of the user according to semantics of the first audio data. Where, in this step, the semantics of the first audio data collected from the user may be analyzed, words in the first audio data from the user may be understood, and the mood of the user may be determined according to the semantics of the words in the first audio data. For example, an electronic device stores different moods corresponding to different semantics, "unhappy-angry", "worry-fear". Therefore, when the electronic device determines that the first audio data from the user is "I am not happy today, play a bright song", the electronic device determines that the mood of the user is angry according to the words "not happy" in the first audio data.

S103: dialoguing with the user using second audio data corresponding to the mood of the user.

Specifically, in this step, the electronic device dialogues with the user using the second audio data corresponding to the mood of the user according to the mood of the user determined in S102. Where, there is a correspondence between the mood of the user and the second audio data, and different moods correspond to different audio data. Optionally, there may further be a mapping relationship between the second audio data in this embodiment and the first audio data, that is, the second audio data is a data used by the electronic device to response to the first audio data from the user when dialoguing with the user. That is, the second audio data is an audio data corresponding to both the first audio data and the mood of the user. Alternatively, the second audio data in this embodiment may further be independent from the first audio data, that is, the electronic device, after determining the mood of the user according to the first audio data from the user, uses the second audio to dialogue with the user during the subsequent dialogue with the user.

Optionally, a possible implementation manner of the S103 is that the electronic device determines the second audio data corresponding to the mood of the user by searching a first mapping relationship, where the first mapping relationship includes at least one correspondence between a mood and an audio data; subsequently, the electronic device uses the second audio data to dialogue with the user. That is, in the present implementation, the electronic device dialogues with the user by using different second audio data determined according to different moods of the user. For example, the first audio data from the user received by the electronic device is "what is the weather today", and the electronic device determines that the mood of the user is "happy" according to the above method before answering the question of the first audio data from the user. Then, the electronic device determines that the second audio data is "the weather today is as sunny as your mood" according to the mood of the user "happy". If the electronic device determines that the mood of the user is "sad", the second audio data determined by the electronic device to answer the same question is "I hope that your mood is as clear as today's weather". Alternatively, the second audio data determined by the electronic device may be independent from the content of the first audio data, that is, for example, when the electronic device determines that the mood of the user is "sad" according to the first audio data, the electronic device determines the second audio data corresponding to "sad" is "Don't be sad, tell you a joke", so that the electronic device may inquire the user according to the mood of the user positively, instead of passively answering the user's question.

Alternatively, another possible implementation manner of the S103 is that the electronic device determines the second audio data according to the semantics of the first audio data, and then the electronic device determines an audio data processing manner corresponding to the mood of the user by searching a second mapping relationship, where the second mapping relationship includes at least one correspondence between a mood and an audio data processing manner; then the electronic device processes the second audio data in the audio data processing manner; and dialogues with the user using the processed second audio data. That is, in this implementation manner, the electronic device determines to use the same second audio data to dialogue with the user according to the semantic content of the first audio data from the user, but determines to process the second audio data according to different moods of the user. For example, when the first audio data from the user received by the electronic device is "what is the weather today", the electronic device determines, according to the semantics of the first audio data as asking about weather, the second audio data for answering the first audio data from the user according to the semantics of the first audio data is "it is a fine day today". Thus, the electronic device, before answering the question of the first audio data from the user using the second audio data, determines that the second audio data processing manner is "frequency 300 Hz, high tone, speak quickly" according to the above method to judge the mood of the user as "happy", and dialogues with the user after the above processing of the second audio data. If the electronic device determines that the mood of the user is "sad", the electronic device determines the second audio data processing manner as "frequency 100 Hz, low tone, speak slow", and dialogues with the user after the above processing of the second audio data.

In summary, in a method for dialoguing based on a mood of a user provided by the present disclosure, a dialogue is made with a user using second audio data corresponding to the mood of the user by collecting first audio data from the user and determining the mood of the user according to the first audio data. Therefore, when an electronic device makes a dialogue with the user, the electronic device may make different and more appropriate responses based on the mood of the user, thereby enriching responses that the electronic device may make according to voice data of the user, and further improving the user experience during dialoguing with the electronic device.

Figure 2:
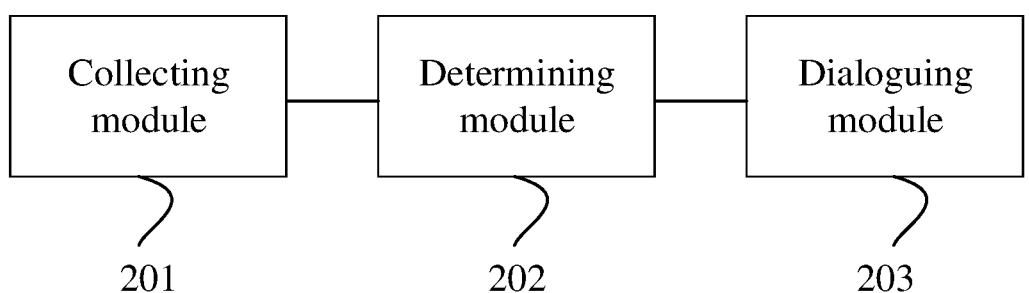
FIG. 2 is a schematic structural diagram of an apparatus for dialoguing based on a mood of a user according to an embodiment of the present disclosure.

FIG. 2 is a schematic structural diagram of an apparatus for dialoguing based on a mood of a user according to an embodiment of the present disclosure. As shown in FIG. 2, the apparatus for dialoguing based on the mood of the user provided in this embodiment including: a collecting module 201, a determining module 202, and a dialoguing module 203. Where, the collecting module 201 is configured to collect first audio data from the user; the determining module 202 is configured to determine a mood of the user according to a feature of the first audio data; and the dialoguing module 203 is configured to dialogue with the user using second audio data corresponding to the mood of the user.

The apparatus for dialoguing based on the mood of the user provided in this embodiment may be used to perform the method for dialoguing based on the mood of the user as shown in FIG. 1, and their implementation manner and specific principle are the same, details of which will not be described herein again.

Optionally, the determining module 202 is specifically configured to determine the mood of the user according to an attribute of the first audio data, where the attribute includes at least one or more of the followings: amplitude, tone, timbre, frequency, and duration of the first audio data.

Optionally, the determining module 202 is specifically configured to determine the mood of the user according to semantics of the first audio data.

Optionally, the dialoguing module 203 is specifically configured to determine the second audio data corresponding to the mood of the user by searching a first mapping relationship, where the first mapping relationship includes at least one correspondence between a mood and an audio data; and dialogue with the user using the second audio data.

Optionally, the dialoguing module 203 is specifically configured to determine an audio data processing manner corresponding to the mood of the user by searching a second mapping relationship, where the second mapping relationship includes at least one correspondence between a mood and an audio data processing manner; process the second audio data with the audio data processing manner; and dialogue with the user using the processed second audio data.

Optionally, the dialoguing module 203 is specifically configured to determine the second audio data according to semantics of the first audio data.

Optionally, the dialoguing module 203 is specifically configured to collect the first audio data from the user when voice data of the user is detected.

Optionally, the dialoguing module 203 is specifically configured to collect the first audio data from the user every preset time interval.

The apparatus for dialoguing based on the mood of the user provided in this embodiment may be used to perform the method for dialoguing based on the mood of the user as shown in the above embodiment, and their implementation manner and specific principle are the same, details of which will not be described herein again.

The present disclosure further provides an electronic device readable storage medium, including a program, the program runs on an electronic device, causing the electronic device to perform the method for dialoguing based on the mood of the user described in any of the above embodiments.

Figure 3:
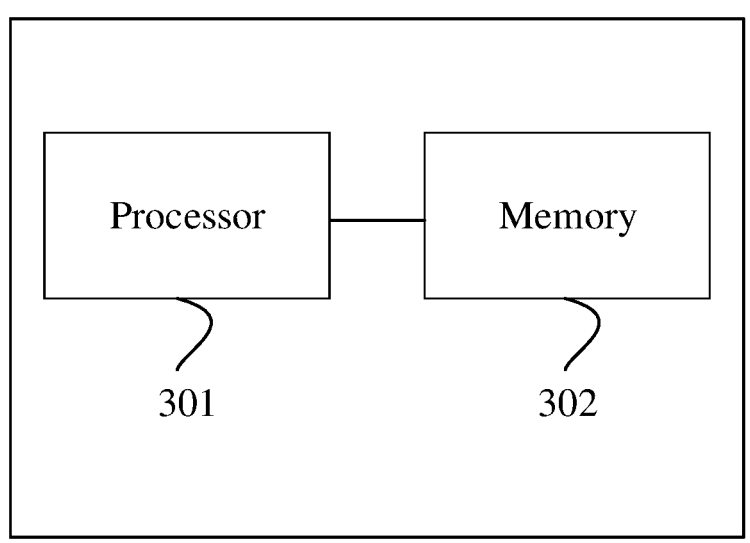
FIG. 3 is another schematic structural diagram of an apparatus for dialoguing based on a mood of a user according to an embodiment of the present disclosure.

FIG. 3 is another schematic structural diagram of an apparatus for dialoguing based on a mood of a user according to an embodiment of the present disclosure. An embodiment of the present disclosure further provides an electronic device, including a processor 301; and a memory 302 for storing instructions executable by the processor 301; where the processor 301 is configured to execute any method for dialoguing based on a mood of a user in the above embodiments by executing the instructions executable.

An embodiment of the disclosure further provides a program product, including a computer program (i.e., instructions an executable) stored in a readable storage medium. At least one processor of an encoding device may read the computer program from the readable storage medium, and the at least one processor executes the computer program such that the encoding apparatus implements the method for dialoguing based on the mood of the user provided by the various embodiments described above.

Persons of ordinary skill in the art will appreciate that all or part of the steps of various embodiments of the method may be accomplished by a hardware associated with program instructions. The aforementioned program may be stored in a computer readable storage medium. When the program being executed, steps including the above embodiments of the method are performed; and the above storage medium includes various medium that may store program code, such as a read only memory (ROM), a random access memory (RAM), a magnetic disk, or an optical disk.

The above are merely preferred embodiments of the present disclosure, and are not intended to limit the present disclosure in any way. Any simple modifications, equivalent replacements and revisions made to the above embodiments in accordance with technical nature of the present disclosure still fall within the scope of technical solutions of the present disclosure.

Finally, it should be noted that the above embodiments are merely illustrative of the technical solutions of the present disclosure, and are not intended to limit thereof; although the present disclosure has been described in detail with reference to the above embodiments, persons of ordinary skill in the art will understand that the technical solutions described in the above embodiments may be modified, or some or all of the technical features may be equivalently replaced; and the modifications or replacements do not make the nature of corresponding technical solutions deviate from the scope of the technical solutions of the embodiments of the present disclosure.

What is claimed is:

1. A method for dialoguing based on a mood of a user, executed by an electronic device, comprising:
    collecting first audio data from the user;
    determining the mood of the user according to a feature of the first audio data; and
    dialoguing with the user using second audio data corresponding to the mood of the user;
    wherein the collecting the first audio data from the user comprises:
        in a case that the user is dialoguing with the electronic device, collecting all words spoken by the user while the user is dialoguing with the electronic device as the first audio data; and
        in a case that the user is talking but does not dialogue with the electronic device, collecting only a subset of words spoken by the user while the user is talking but does not dialogue with the electronic device as the first audio data, wherein the collecting of the subset of the words includes collecting at least one word every preset time interval.

2. The method according to claim 1, wherein the determining the mood of the user according to the feature of the first audio data comprises:
    determining the mood of the user according to an attribute of the first audio data; wherein the attribute comprises at least one of the following: amplitude, tone, timbre, frequency, and duration of the first audio data.

3. The method according to claim 1, wherein the determining the mood of the user according to the feature of the first audio data comprises:
    determining the mood of the user according to semantics of the first audio data.

4. The method according to claim 1, wherein the dialoguing with the user using the second audio data corresponding to the mood of the user comprises:
    determining the second audio data corresponding to the mood of the user by searching a first mapping relationship, wherein the first mapping relationship comprises at least one correspondence between a mood and audio data; and
    dialoguing with the user using the second audio data.

5. The method according to claim 1, wherein the dialoguing with the user using the second audio data corresponding to the mood of the user comprises:
    determining an audio data processing manner corresponding to the mood of the user by searching a second mapping relationship, wherein the second mapping relationship comprises at least one correspondence between a mood and an audio data processing manner;
    processing the second audio data with the audio data processing manner; and
    dialoguing with the user using the processed second audio data.

6. The method according to claim 5, wherein before the determining the audio data processing manner corresponding to the mood of the user by searching the second mapping relationship, further comprising:
    determining the second audio data according to semantics of the first audio data.

7. An apparatus for dialoguing based on a mood of a user, comprising:
    a memory, configured to storing instructions; and
    a processor, configured to execute the instructions, to:
    collect first audio data from the user;
    determine the mood of the user according to the first audio data; and
    dialogue with the user using second audio data corresponding to the mood of the user;
    wherein the processor is configured to execute the instructions, to:
        in a case that the user is dialoguing with the apparatus, collect all words spoken by the user while the user is dialoguing with the apparatus as the first audio data; and
        in a case that the user is talking but does not dialogue with the apparatus, collect only a subset of words spoken by the user while the user is talking but does not dialogue with the apparatus as the first audio data, wherein the collecting of the subset of the words includes collecting at least one word every preset time interval.

8. The apparatus according to claim 7, wherein the processor is configured to execute the instructions, to:
    determine the mood of the user according to an attribute of the first audio data, wherein the attribute comprises at least one of the following: amplitude, tone, timbre, frequency, and duration of the first audio data.

9. The apparatus according to claim 7, wherein the processor is configured to execute the instructions, to:
determine the mood of the user according to semantics of the first audio data.

10. The apparatus according to claim 7, wherein the processor is configured to execute the instructions, to:
determine the second audio data corresponding to the mood of the user by searching a first mapping relationship, wherein the first mapping relationship comprises at least one correspondence between a mood and an audio data; and
dialogue with the user using the second audio data.

11. The apparatus according to claim 7, wherein the processor is configured to execute the instructions, to:
determine an audio data processing manner corresponding to the mood of the user by searching a second mapping relationship, wherein the second mapping relationship comprises at least one correspondence between a mood and an audio data processing manner;
process the second audio data with the audio data processing manner; and
dialogue with the user using the processed second audio data.

12. The apparatus according to claim 11, wherein the processor is configured to execute the instructions, to:
determine the second audio data according to semantics of the first audio data.

13. A non-transitory storage medium readable by an electronic device, comprising a program, when the program is run on the electronic device, causing the electronic device to perform the method for dialoguing based on the mood of the user according to claim 1.

* * * * *